United States Patent
Kim et al.

(10) Patent No.: US 9,140,608 B2
(45) Date of Patent: Sep. 22, 2015

(54) DEVICE AND METHOD FOR PROCESSING IMAGE FOR SUBSTANTIALLY ACCURATELY REPRODUCED COLOR IMAGES FROM A CAMERA

(71) Applicant: Samsung Display Co., Ltd., Yongin, Gyeonggi-Do (KR)

(72) Inventors: Kyoung-Tae Kim, Yongin (KR); Byong-Tae Ryu, Yongin (KR); Jae-Woo Bae, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 60 days.

(21) Appl. No.: 14/022,673

(22) Filed: Sep. 10, 2013

(65) Prior Publication Data
US 2014/0333797 A1    Nov. 13, 2014

(30) Foreign Application Priority Data
May 10, 2013  (KR) .......................... 10-2013-0053222

(51) Int. Cl.
| G06K 9/00 | (2006.01) |
| G01J 3/50 | (2006.01) |
| G09G 5/02 | (2006.01) |
| H04N 9/67 | (2006.01) |

(52) U.S. Cl.
CPC . *G01J 3/505* (2013.01); *G09G 5/02* (2013.01); *H04N 9/67* (2013.01)

(58) Field of Classification Search
None
See application file for complete search history.

(56) References Cited

U.S. PATENT DOCUMENTS

| 7,420,663 | B2 * | 9/2008 | Wang et al. ..................... 356/72 |
| 8,644,605 | B2 * | 2/2014 | Bao et al. ....................... 382/164 |
| 8,837,821 | B2 * | 9/2014 | Hirota et al. .................. 382/164 |
| 2005/0088550 | A1 * | 4/2005 | Mitsunaga et al. ........... 348/272 |
| 2006/0104505 | A1 * | 5/2006 | Chen et al. .................... 382/162 |
| 2007/0053607 | A1 * | 3/2007 | Mitsunaga .................... 382/274 |
| 2007/0081182 | A1 * | 4/2007 | Shiohara ...................... 358/1.13 |
| 2008/0247662 | A1 * | 10/2008 | Yasuma et al. ................ 382/264 |
| 2014/0333797 | A1 * | 11/2014 | Kim et al. .................. 348/223.1 |

FOREIGN PATENT DOCUMENTS

| KR | 1020000026693 A | 5/2000 |
| KR | 1020050006424 A | 1/2005 |
| KR | 1020080105967 A | 12/2008 |

OTHER PUBLICATIONS

Stone et al, RAW File Treatment and Color Management, May 12, 2012, https://web.archive.org/web/20120512113748/http://docs.kde.org/development/en/extragear-graphics/digikam/raw-decoding.html.*

\* cited by examiner

*Primary Examiner* — Andrae S Allison
(74) *Attorney, Agent, or Firm* — Cantor Colburn LLP

(57) ABSTRACT

An image processing device includes: a demosaicking unit which converts a bayer image from a camera sensor into red, green image and blue images; a first color space conversion unit which converts first camera RGB data into first display R'G'B' data using a first color space conversion matrix; and a display unit which displays an image using the first display R'G'B' data, where the first color space conversion matrix is calculated from a relationship in which the product of the first color space conversion matrix and a transpose of a first N×3 matrix is a transpose of a second N×3 matrix, where the first N×3 matrix represents camera RGB data of N number of colors, and the second N×3 matrix represents display R'G'B' data of the N number of colors calculated by measuring the N number of colors displayed in the display unit using a spectrophotometer.

22 Claims, 5 Drawing Sheets

DEVICE AND METHOD FOR PROCESSING IMAGE FOR SUBSTANTIALLY ACCURATELY REPRODUCED COLOR IMAGES FROM A CAMERA

This application claims priority to Korean Patent Application No. 10-2013-0053222 filed on May 10, 2013, and all the benefits accruing therefrom under 35 U.S.C. §119, the content of which in its entirety is herein incorporated by reference.

BACKGROUND (a) Field

Exemplary embodiments of the invention relates to a device and a method for processing an image. More particularly, the invention relates to a device and a method for processing an image, in which a color of an image that is photographed in a camera in a display is substantially accurately reproduced.

(b) Description of the Related Art

In order for a display device to accurately reproduce a color of an image that is photographed in a camera of a mobile phone, a digital camera and a camcorder, the camera and the display device are desired to have the same color gamut. In order for a color gamut of the camera to correspond to a color gamut of the display, a standardized sRGB color gamut under daylight 6500K ("D65") is typically used as a color gamut to use for storage and reproduction of an image. This corresponds to 70% color gamut based on a national television system committee ("NTSC").

However, an organic light emitting display typically has a wide color gamut (110% color gamut based as an NTSC), compared with the sRGB color gamut under D65. Therefore, an image that is generated using an sRGB color gamut under D65 as a standard may not be substantially accurately displayed by an organic light emitting display. That is, when displaying an image that is photographed in a camera having a narrow color gamut in an organic light emitting display having a wide color gamut, a color of the image may be exaggeratingly viewed further than an actual color.

SUMMARY

Exemplary embodiments of the invention relate to a device and a method for processing an image with improved accuracy in reproducing a color of an image that is photographed in a camera in an organic light emitting display.

An exemplary embodiment of an image processing device includes: a camera sensor unit which generates a bayer image; a demosaicking unit which converts the bayer image into a red image, a green image and a blue image; a first color space conversion unit which converts first camera RGB data including data of the red image, the green image and the blue image into first display R'G'B' data using a first color space conversion matrix; and a display unit which displays an image using the first display R'G'B' data, where the first color space conversion matrix is calculated from a relationship, in which the product of the first color space conversion matrix and a transpose of a first N×3 matrix is a transpose of a second N×3 matrix, where the first N×3 matrix represents camera RGB data of N number of colors, and the second N×3 matrix represents display R'G'B' data of the N number of colors, which are calculated by measuring the N number of colors displayed in the display unit using a spectrophotometer, and where N is a natural number.

In an exemplary embodiment, the image processing device may further include a second color space conversion unit which converts the first camera RGB data into first sRGB data including red image data, green image data and blue image data in an sRGB color gamut using a second color space conversion matrix.

In an exemplary embodiment, the second color space conversion matrix may be calculated from a relationship, in which the product of the second color space conversion matrix and a transpose of the first N×3 matrix is a transpose of a third N×3 matrix, where the third N×3 matrix represents sRGB data of the N number of colors in the sRGB color gamut.

In an exemplary embodiment, the image processing device may further include a data transmitting and receiving unit which transmits the first sRGB data and receives second sRGB data.

In an exemplary embodiment, the second color space conversion unit may convert the second sRGB data into second camera RGB data using an inverse matrix of the second color space conversion matrix, the first color space conversion unit may convert the second camera RGB data into second display R'G'B' data using the first color space conversion matrix, and the display unit may display an image using the second display R'G'B' data.

In an exemplary embodiment, the image processing device may further include a data storage unit which stores the first display R'G'B' data.

In an exemplary embodiment, the first color space conversion unit may convert the first display R'G'B' data, which are stored at the data storage unit, into the first camera RGB data using an inverse matrix of the first color space conversion matrix.

In an exemplary embodiment, the image processing device may further include a pre-processing unit which adjusts a black level of the bayer image and which removes noise in the bayer image.

In an exemplary embodiment, the image processing device may further include a white balancing unit which performs white balancing of the bayer image.

In an exemplary embodiment, the image processing device may further include a gamma correction unit which performs gamma correction of the red image, the green image and the blue image based on a visual perceptual property of humans.

In an exemplary embodiment, the image processing device may further include a post-processing unit which performs a post-processing for adjusting an edge, a contrast and saturation of the first display R'G'B' data.

An exemplary embodiment of a method of processing an image includes: generating a bayer image including a red channel value, a green channel value and a blue channel value; converting the bayer image into a red image, a green image and a blue image; converting camera RGB data including data of the red image, the green image and the blue image into display R'G'B' data using a first color space conversion matrix; and displaying an image in a display unit using the display R'G'B' data, where the first color space conversion matrix is calculated from a relationship, in which the product of the first color space conversion matrix and a transpose of a first N×3 matrix is a transpose of a second N×3 matrix, where the first N×3 matrix represents camera RGB data of N number of colors, and the second N×3 matrix represents display R'G'B' data of the N number of colors, which are calculated by measuring the N number of colors displayed in the display unit using a spectrophotometer, and where N is a natural number.

In an exemplary embodiment, the generating the bayer image may include adjusting a black level of the bayer image and removing noise in the bayer image; and performing white balancing of the bayer image.

In an exemplary embodiment, the converting the bayer image may include performing gamma correction of the red image, the green image and the blue image based on a visual perceptual property of humans.

In an exemplary embodiment, the converting the camera RGB data may include performing a post-processing for adjusting an edge, a contrast and saturation of the display R'G'B' data.

In an exemplary embodiment, the method may further include: converting the camera RGB data into sRGB data including red image data, green image data and blue image data in an sRGB color gamut using a second color space conversion matrix; and transmitting the sRGB data through a data transmitting and receiving unit.

In an exemplary embodiment, the second color space conversion matrix may be calculated from a relationship, in which the product of the second color space conversion matrix and a transpose of the first N×3 matrix is a transpose of a third N×3 matrix, where the third N×3 matrix represents sRGB data of the N number of colors in the sRGB color gamut.

In an exemplary embodiment, the method may further include storing the display R'G'B' data at a data storage unit.

An alternative exemplary embodiment of a method of processing an image includes: receiving sRGB data including red image data, green image data and blue image data in an sRGB color gamut through a data transmitting and receiving unit; converting the sRGB data into camera RGB data using an inverse matrix of a second color space conversion matrix; and converting the camera RGB data into display R'G'B' data using the first color space conversion matrix, where the first color space conversion matrix is calculated from a relationship, in which the product of the first color space conversion matrix and a transpose of a first N×3 matrix is a transpose of a second N×3 matrix, where the first N×3 matrix represents camera RGB data of N number of colors, and the second N×3 matrix represents display R'G'B' data of the N number of colors, which are calculated by measuring the N number of colors displayed in the display unit using a spectrophotometer, and where N is a natural number.

In an exemplary embodiment, the second color space conversion matrix may be calculated from a relationship, in which the product of the second color space conversion matrix and a transpose of the first N×3 matrix is a transpose of a third N×3 matrix, where the third N×3 matrix represents sRGB data of the N number of colors in the sRGB color gamut.

In an exemplary embodiment, the receiving the sRGB data may include generating a bayer image including a red channel value, a green channel value and a blue channel value in a first image processing device; converting the bayer image into a red image, a green image and a blue image; converting camera RGB data including data of the red image, the green image and the blue image into the sRGB data using a second color space conversion matrix of the first image processing device; and receiving the sRGB data from the first image processing device.

In an exemplary embodiment, the receiving the sRGB data may include converting first display R'G'B' data, which is stored at the first image processing device, into first camera RGB data using an inverse matrix of the first color space conversion matrix of the first image processing device; converting the first camera RGB data into the sRGB data using a second color space conversion matrix of the first image processing device; and receiving the sRGB data from the first image processing device.

In exemplary embodiments, when an image that is photographed in a camera having a narrow color gamut is displayed in an organic light emitting display having a wide color gamut, a color of the image is reproduced substantially equally to an actual color.

In exemplary embodiment of an organic light emitting display, an image that is generated with sRGB standard color gamut under daylight 6500K ("D65") may be effectively displayed with an accurate color.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
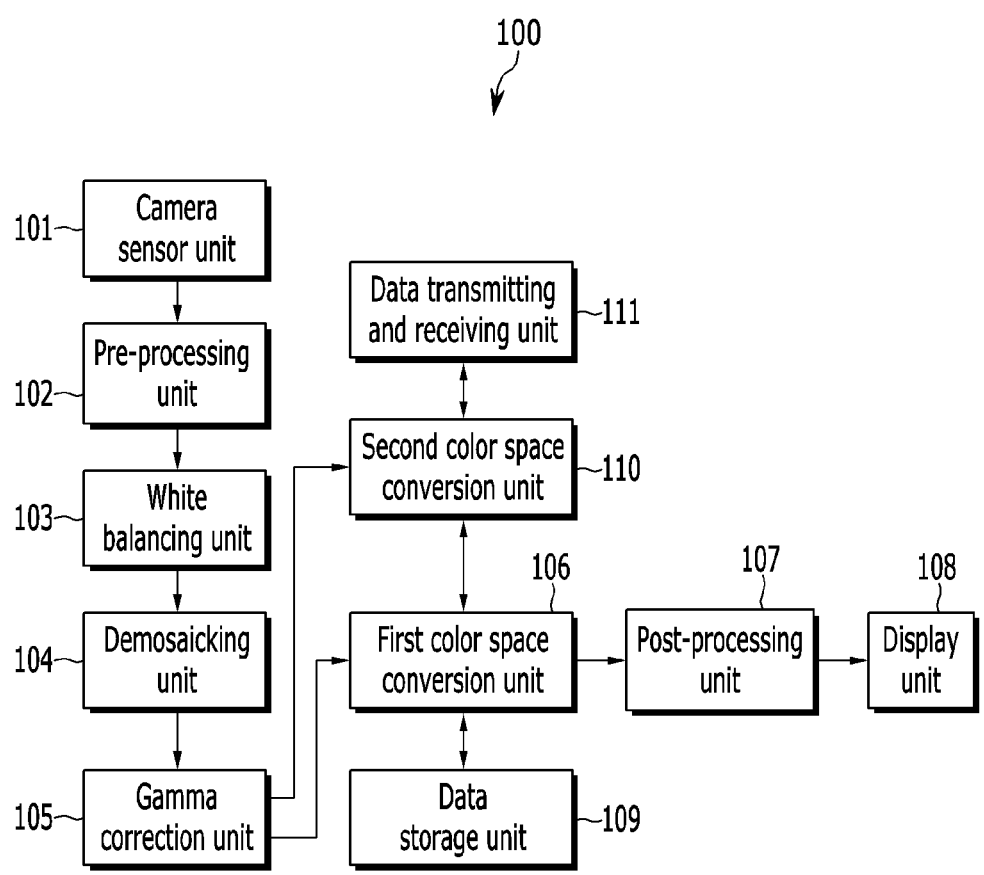
FIG. 1 is a block diagram illustrating an exemplary embodiment of an image processing device according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, the element or layer can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

FIG. 1 is a block diagram illustrating an exemplary embodiment of an image processing device according to the invention.

Referring to FIG. 1, an exemplary embodiment of an image processing device 100 includes a camera sensor unit 101, a pre-processing unit 102, a white balancing unit 103, a demosaicking unit 104, a gamma correction unit 105, a first color space conversion unit 106, a post-processing unit 107, a display unit 108, a data storage unit 109, a second color space conversion unit 110 and a data transmitting and receiving unit 111.

In an exemplary embodiment, the camera sensor unit 101 includes a color filter and an image sensor, such as a complementary metal-oxide semiconductor ("CMOS") or a charge coupled device ("CCD"), for example. An image that is acquired by an image sensor such as a CMOS or a CCD is a monochrome image and thus a color filter for passing through only a predetermined frequency band in a visible spectrum may be provided, e.g., disposed, at a front end portion of the image sensor to acquire a color image. The color filter allows an image having a specific frequency band in an image of a subject to pass therethrough. The color filter is divided into a plurality of areas, and each area allows only a video signal having a frequency band substantially the same as a frequency band of one color of three colors of red, green and blue to pass therethrough. In one exemplary embodiment, for example, the color filter includes a Bayer filter mosaic. The video signal that passes through the color filter is transferred to an image sensor such as a CMOS or a CCD. The image sensor converts the received video signal into an electrical signal. In such an embodiment, the electrical signal corresponds to the video signal that passes through the color filter, such that the electrical signal includes a red channel value, a green channel value and a blue channel value. In such an embodiment, a bayer image (e.g., a Bayer pattern image) including an array of a red channel value, a green channel value and a blue channel value is generated.

In an exemplary embodiment, the pre-processing unit 102 adjusts a black level of the bayer image and removes noise in the bayer image.

In such an embodiment, the white balancing unit 103 performs white balancing of the bayer image such that color balance is adjusted for accurate color reproduction. A color that is distorted by lighting in the bayer image may be corrected into a color in which a human recognizes through white balancing.

In an exemplary embodiment, the demosaicking unit 104 converts the bayer image into a green image, a red image and a blue image. In such an embodiment, the demosaicking unit 104 may convert the bayer image having a single channel into a color image having 3 channels.

In an exemplary embodiment, the gamma correction unit 105 performs gamma correction of the green image, the red image and the blue image based on a visual perceptual property of humans. In such an embodiment, the gamma correction unit 105 may nonlinearly convert each of the green image, the red image and the blue image using a nonlinear transfer function based on a nonlinear visual perceptual property of humans.

Hereinafter, data of the green image, data of the red image, and data of the blue image, in which gamma correction is performed will be collectively referred to as "camera RGB data." The camera RGB data includes a color coordinate of a color in a color gamut of a camera.

In an exemplary embodiment, the first color space conversion unit 106 converts the camera RGB data into display R'G'B' data using a first color space conversion matrix. The display R'G'B' data include green image data, red image data and blue image data based on color gamut characteristics of the display unit 108. The display R'G'B' data includes a color coordinate of a color in a color gamut of the display. In such an embodiment, the first color space conversion matrix converts the camera RGB data into the display R'G'B' data based on color gamut characteristics of a display such that a color of an image that is photographed by a color gamut of a camera is displayed with substantially the same color without distortion in a display. An exemplary embodiment of a method of calculating the first color space conversion matrix will be described later in greater detail with reference to FIG. 2.

In such an embodiment, the first color space conversion unit 106 may inversely convert the display R'G'B' data into the camera RGB data using an inverse matrix of the first color space conversion matrix.

In an exemplary embodiment, the post-processing unit 107 performs a post-processing that adjust, e.g., improves, an edge, a contrast and saturation of the display R'G'B' data.

The display unit 108 displays an image using the display R'G'B' data, in which a post-processing is performed. In one exemplary embodiment, for example, the display unit 108 may be an organic light emitting display, and the organic light emitting display may have a color gamut of 110% based on an NTSC.

In an exemplary embodiment, the data storage unit 109 stores the display R'G'B' data that is converted in the first color space conversion unit 106. In such an embodiment, the display R'G'B' data corresponding to color gamut characteristics of the display unit 108 may be stored at the data storage unit 109.

In an exemplary embodiment, the second color space conversion unit 110 converts the camera RGB data to sRGB data using a second color space conversion matrix. The sRGB data includes green image data, red image data and blue image data in an sRGB color gamut under daylight 6500K ("D65"). The sRGB color gamut corresponds to 70% color gamut based on an NTSC. The sRGB data includes a color coordinate of a color in the sRGB color gamut. The second color space conversion matrix converts the camera RGB data into the sRGB data in an sRGB color gamut, which is a standard color gamut to transmit and receive a photographed image. An exemplary embodiment of a method of calculating the second color space conversion matrix will be described later in greater detail with reference to FIG. 3.

In such an embodiment, the second color space conversion unit 110 may inversely convert the sRGB data into the camera RGB data using an inverse matrix of the second color space conversion matrix.

As described above, a color gamut of a photographed image may be different from an sRGB color gamut, but a color gamut of the photographed image may be substantially the same as the sRGB color gamut. Accordingly, in an exemplary embodiment, camera RGB data may be substantially the same as the sRGB data of the sRGB color gamut. In such an embodiment, the second color space conversion unit 110 may be omitted.

The data transmitting and receiving unit 111 transmits the sRGB data to another image processing device or receives sRGB data from another image processing device. Another image processing device may use any one of a camera color gamut and a display color gamut, and image data that is transmitted and received to and from the image processing device may be data of a standard color gamut that is widely used in a random image processing device. Therefore, image data that image processing devices including the data transmitting and receiving unit 11 transmit and receive may be converted into the sRGB data of an sRGB color gamut.

Figure 2:
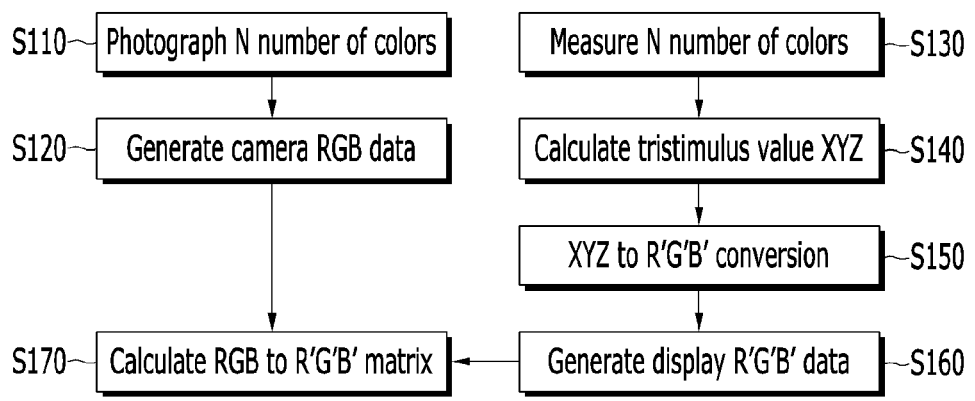
FIG. 2 is a flowchart illustrating an exemplary embodiment of a method of calculating a first color space conversion matrix of an image processing device according to the invention.

FIG. 2 is a flowchart illustrating an exemplary embodiment of a method of calculating a first color space conversion matrix of an image processing device according to the invention.

Referring to FIG. 2, in an exemplary embodiment, the first color space conversion matrix of the image processing device 100 may be an RGB to R'G'B' matrix that converts the camera RGB data into the display R'G'B' data.

A predetermined number of colors, e.g., N number of colors, are photographed by the camera sensor unit 101 of the image processing device 100 (S110). Here, N is a natural number. The N number of colors may be randomly selected. In an exemplary embodiment, for example, the N number of colors may be selected as red, green and blue for an accurate calculation of the first color space conversion matrix. In an alternative exemplary embodiment, the N number of colors may be selected as other colors including cyan, magenta, yellow and white, other than red, green and blue for a more accurate calculation of the first color space conversion matrix.

In an exemplary embodiment, the photographed image is processed in the pre-processing unit 102, the white balancing unit 103, the demosaicking unit 104 and the gamma correction unit 105, and the photographed image is generated into camera RGB data (S120). In such an embodiment, a pre-processing process, a white balancing process, a demosaicking process and a gamma correction process of a bayer image that is formed in the camera sensor unit 101 may be performed, and the camera RGB data of the N number of colors is thereby generated.

The N number of colors are displayed in the display unit 108, and the N number of colors may be measured by a spectrophotometer (S130).

When intensity of each wavelength of the N number of colors that are displayed in the display unit 108 is measured by the spectrophotometer, a tristimulus value XYZ of each of the N number of colors is calculated (S140).

The tristimulus value XYZ of each of the N number of colors is converted into display R'G'B' data using an XYZ to R'G'B' inverse conversion matrix that converts the tristimulus value XYZ into the display R'G'B' data (S150). The R'G'B' to XYZ conversion matrix that reflects color gamut characteristics of a display may be calculated based on measurement using the spectrophotometer. Therefore, the XYZ to R'G'B' inverse conversion matrix, which is an inverse matrix of an R'G'B' to XYZ conversion matrix, may be calculated.

The display R'G'B' data of the N number of colors are generated using the XYZ to R'G'B' inverse conversion matrix (S160).

The RGB to R'G'B' matrix is calculated based on a relationship between the camera RGB data of the N number of colors and the display R'G'B' data of the N number of colors (S170).

In an exemplary embodiment, the camera RGB data of the N number of colors and the display R'G'B' data of the N number of colors may be represented by N×3 matrices including a first N×3 matrix and a second N×3 matrix, and the camera RGB data of the N number of colors and the display R'G'B' data of the N number of colors may be represented by Equation 1.

$$A = \begin{bmatrix} RC_1 & GC_1 & BC_1 \\ RC_2 & GC_2 & BC_2 \\ & \cdots & \\ RC_N & GC_N & BC_N \end{bmatrix}$$

$$B = \begin{bmatrix} RD_1 & GD_1 & BD_1 \\ RD_2 & GD_2 & BD_2 \\ & \cdots & \\ RD_N & GD_N & BD_N \end{bmatrix}$$

Equation 1

In Equation 1, A represents an N×3 matrix of the camera RGB data of the N number of colors (i.e., the first N×3 matrix), and B represents an N×3 matrix of the display R'G'B' data of the N number of colors (i.e., the second N×3 matrix). $RC_1$, $GC_1$ and $BC_1$ denote a color coordinate of a first color in the camera RGB data, $RC_2$, $GC_2$ and $BC_2$ denote a color coordinate of a second color in the camera RGB data, and $RC_N$, $GC_N$ and $BC_N$ denote a color coordinate of the N-th color in the camera RGB data. $RD_1$, $GD_1$ and $BD_1$ denote a color coordinate of the first color in the display R'G'B' data, $RD_2$, $GD_2$ and $BD_2$ denote a color coordinate of the second color in the display R'G'B' data, and $RD_N$, $GD_N$ and $BD_N$ denote a color coordinate of the N-th color in the display R'G'B' data.

When an RGB to R'G'B' matrix, e.g., a first color space conversion matrix is represented with M, a relationship of A, B and M satisfy the following Equation 2.

$$M \cdot A^T = B^T$$

Equation 2

In Equation 2, $A^T$ denotes a transpose of A, and $B^T$ denotes a transpose of B.

In Equation 2, when multiplying the transpose of $A^T$, that is A, to both sides and when multiplying an inverse matrix of $(A^T \cdot A)$, that is, $(A^T \cdot A)^{-1}$, to both sides, the first color space conversion matrix M satisfies the following Equation 3.

$$M = B^T \cdot A \cdot (A^T \cdot A)^{-1}$$

Equation 3

As described above, in an exemplary embodiment where the camera RGB data of the N number of colors is represented by A that is a N×3 matrix, and the display R'G'B' data of the N number of colors that are calculated by measuring the N number of colors that are displayed in the display unit 108 by the spectrophotometer is represented by B that is a N×3 matrix, the first color space conversion matrix may be calculated from a relationship in which the product of the first color space conversion matrix M and a transpose of A is a transpose of B, as shown in Equation 2.

The calculated first color space conversion matrix may be used for converting the camera RGB data into the display R'G'B' data in the first color space conversion unit 106 of FIG. 1.

Figure 3:
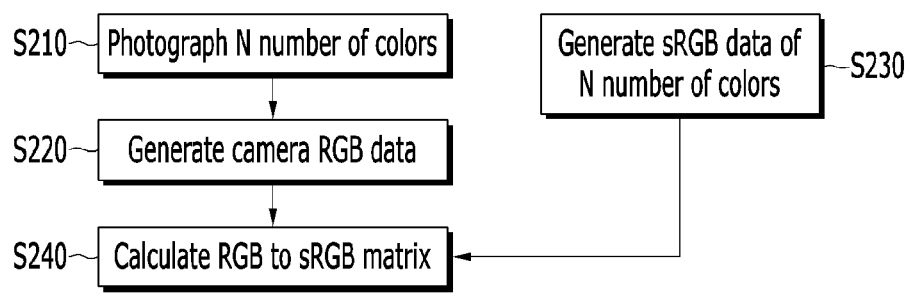
FIG. 3 is a flowchart illustrating an exemplary embodiment of a method of calculating a second color space conversion matrix of an image processing device according to the invention.

FIG. 3 is a flowchart illustrating an exemplary embodiment of a method of calculating a second color space conversion matrix of an image processing device according to the invention.

Referring to FIG. 3, a second color space conversion matrix of the image processing device 100 is an RGB to sRGB matrix that converts the camera RGB data into the sRGB data.

The predetermined number of colors, e.g., N number of colors, are photographed by the camera sensor unit 101 of the image processing device 100 (S210). The N number of colors may be selected with random colors. In one exemplary embodiment, for example, the N number of colors may be selected with red, green and blue for accurate calculation of the second color space conversion matrix. In an alternative exemplary embodiment, the N number of colors may be selected with cyan, magenta, yellow and white, other than red, green and blue, to more accurately calculate the second color space conversion matrix.

In an exemplary embodiment, the photographed image is processed in the pre-processing unit 102, the white balancing unit 103, the demosaicking unit 104 and the gamma correction unit 105, and is generated into the camera RGB data (S220). In such an embodiment, a pre-processing process, a white balancing process, a demosaicking process and a gamma correction process of a bayer image that is formed in the camera sensor unit 101 may be performed, and camera RGB data of the N number of colors are thereby generated.

In an exemplary embodiment, sRGB data of the predetermined N number of colors is generated (S230). An sRGB color gamut is a standardized color, and the sRGB data of the predetermined N number of colors may be derived from a look-up table of an sRGB color gamut.

An RGB to sRGB matrix is calculated from a relationship between camera RGB data of the N number of colors and sRGB data of the N number of colors (S240). The RGB to sRGB matrix, e.g., the second color space conversion matrix, may be derived with the same method as in the method described with reference to Equations 1 to 3 and FIG. 2. In such an embodiment, when the camera RGB data of the N number of colors is represented with an N×3 matrix, e.g., the first N×3 matrix A, and, when sRGB data of the N number of colors in an sRGB color gamut is represented with an N×3 matrix, e.g., a third N×3 matrix B', the second color space conversion matrix is calculated from a relationship, in which the product of the second color space conversion matrix and a transpose of the first N×3 matrix A is a transpose of the third N×3 matrix B'.

Hereinafter, an exemplary embodiment of a method of processing image data in a process in which the image processing devices 100 transmit and receive image data will be described.

Figure 4:
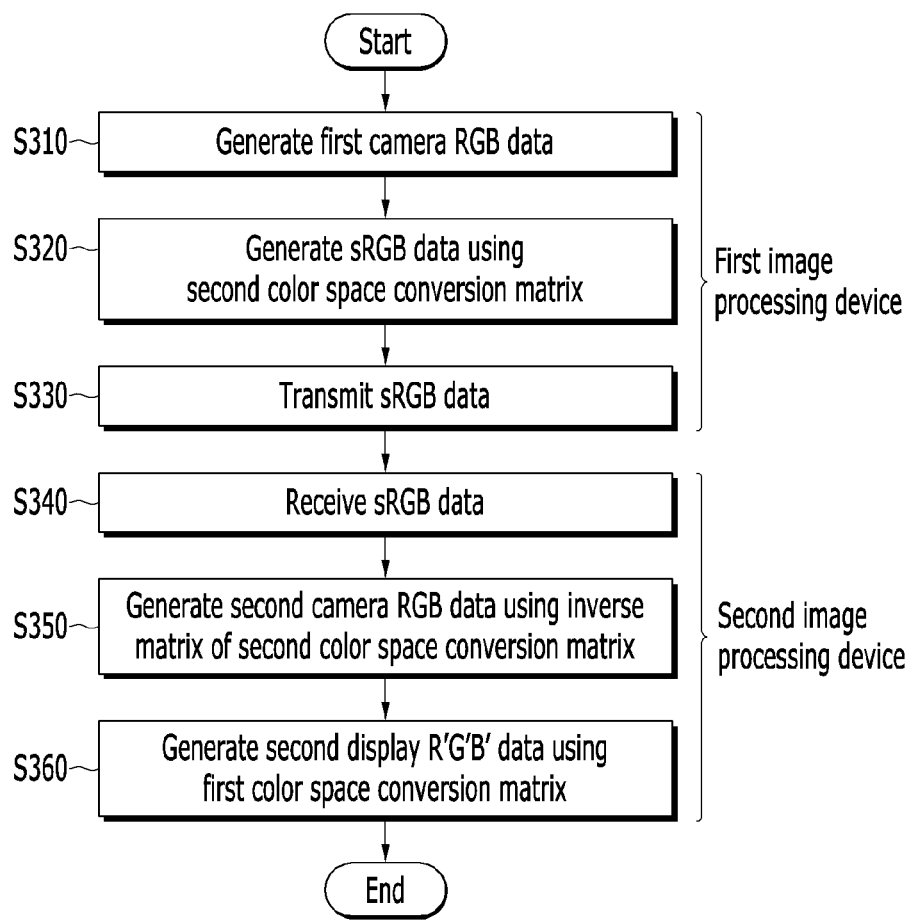
FIG. 4 is a flowchart illustrating an exemplary embodiment of a method of processing an image in a first image processing device and a second image processing device according to the invention.

FIG. 4 is a flowchart illustrating an exemplary embodiment of a method of processing an image in a first image processing device and a second image processing device according to the invention.

FIG. 4 illustrates an exemplary embodiment of a method including transmitting an image that is photographed in the first image processing device to the second image processing device.

In an exemplary embodiment, an image that is photographed in the first image processing device is generated into first camera RGB data (S310). In such an embodiment, an image that is photographed in the first camera unit of the first image processing device may be generated into the first camera RGB data through a pre-processing unit, a white balancing unit, a demosaicking unit and a gamma correction unit of the first image processing device. In such an embodiment, in the first image processing device, the first camera RGB data is converted into the first display R'G'B' data using the first color space conversion matrix of the first image processing device, and the first display R'G'B' data may be displayed into an image through a display unit of the first image processing device.

In an exemplary embodiment, the first camera RGB data is generated into sRGB data using a second color space conversion matrix of the first image processing device (S320). In such an embodiment, the first camera RGB data may be converted into sRGB data through the second color space conversion unit of the first image processing device. A second color space conversion matrix of the first image processing device converts the first camera RGB data into sRGB data.

The sRGB data is transmitted to the second image processing device through the data transmitting and receiving unit of the first image processing device (S330).

In an exemplary embodiment, the sRGB data is received in the second image processing device (S340). In such an embodiment, the second image processing device may receive the sRGB data through the data transmitting and receiving unit.

In an exemplary embodiment, the sRGB data is generated into second camera RGB data using an inverse matrix of the second color space conversion matrix of the second image processing device (S350). In such an embodiment, sRGB data may be converted into the second camera RGB data through the second color space conversion unit of the second image processing device. The second color space conversion matrix of the second image processing device converts the second camera RGB data into sRGB data, and an inverse matrix thereof converts sRGB data into second camera RGB data.

In an exemplary embodiment, the second camera RGB data is generated into second display R'G'B' data using the first color space conversion matrix of the second image processing device (S360). In such an embodiment, the second camera RGB data is converted into the second display R'G'B' data through the first color space conversion unit of the second image processing device. In the second image processing device, the first color space conversion matrix converts the second camera RGB data into second display R'G'B' data. The second display R'G'B' data may be displayed into an image through a display unit of the second image processing device.

In an exemplary embodiment, as described above, the first image processing device converts and transmits the first camera RGB data into sRGB data of a standardized sRGB color gamut, and the second image processing device converts sRGB data into second camera RGB data, converts the second camera RGB data into the second display R'G'B' data, and displays the second display R'G'B' data in the display unit such that image processing devices having different camera color gamuts and display color gamuts may transmit and receive image data without distortion of a color.

Figure 5:
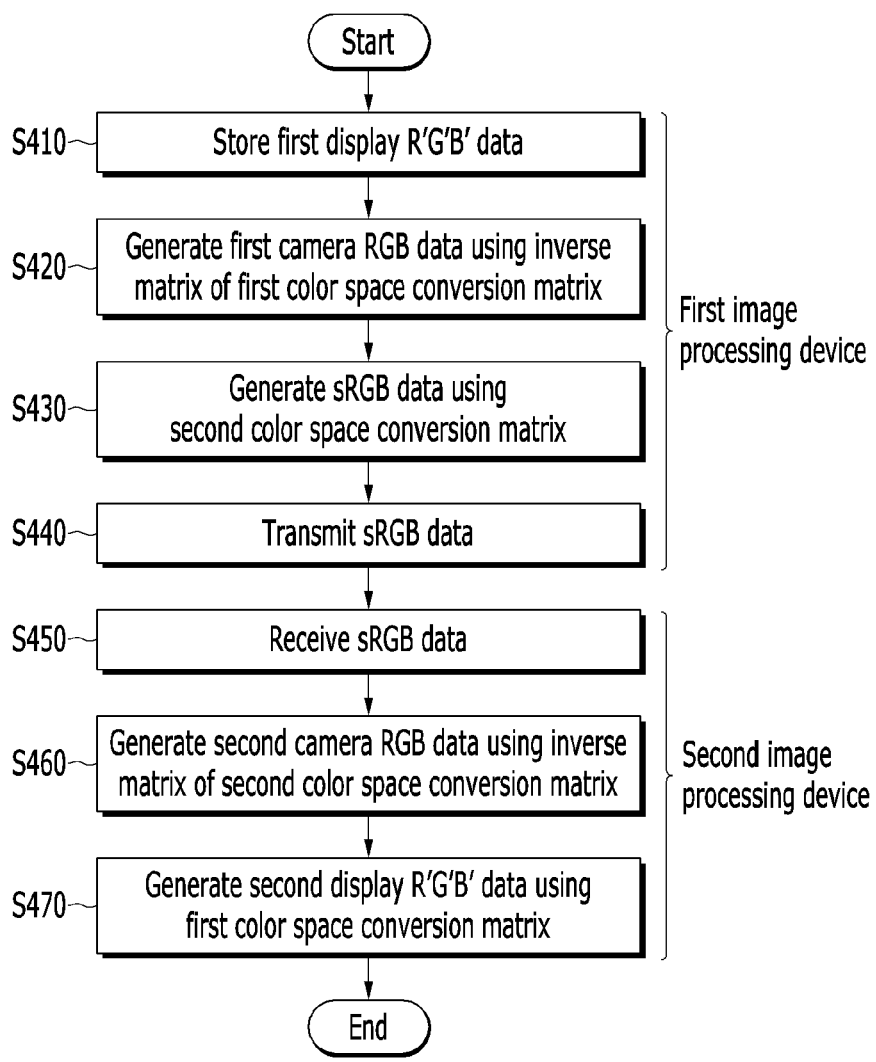
FIG. 5 is a flowchart illustrating an alternative exemplary embodiment of a method of processing an image in a first image processing device and a second image processing device according to the invention.

FIG. 5 is a flowchart illustrating an alternative exemplary embodiment of a method of processing an image in a first image processing device and a second image processing device according to the invention.

FIG. 5 illustrates an exemplary embodiment of a method including transmitting an image that is stored at the first image processing device to the second image processing device.

In an exemplary embodiment, an image that is photographed in the first image processing device may be stored into first display R'G'B' data that may be displayed in a display unit of the first image processing device (S410). In such an embodiment, an image that is photographed in the first camera unit of the first image processing device is generated into first camera RGB data through a pre-processing unit, a white balancing unit, a demosaicking unit and a gamma correction unit of the first image processing device. The first camera RGB data is converted into first display R'G'B' data through a first color space conversion unit of the first image processing device, and the first display R'G'B' data may be displayed into an image through a display unit of the first image processing device. In an exemplary embodiment, the first display R'G'B' data that is converted through the first color space conversion unit may be stored at a data storage unit of the first image processing device.

In an exemplary embodiment, the first display R'G'B' data that is stored at the first image processing device is generated into first camera RGB data using an inverse matrix of the first color space conversion matrix of the first image processing device (S420). In such an embodiment, the first display R'G'B' data may be converted into first camera RGB data through the first color space conversion unit of the first image processing device. The first color space conversion matrix of the first image processing device converts the first camera RGB data into first display R'G'B' data, and an inverse matrix thereof converts the first display R'G'B' data into first camera RGB data.

In an exemplary embodiment, the first camera RGB data is generated into sRGB data using a second color space conversion matrix of the first image processing device (S430). In such an embodiment, the first camera RGB data is converted into sRGB data through a second color space conversion unit of the first image processing device. The second color space conversion matrix of the first image processing device converts the first camera RGB data into sRGB data.

The sRGB data is transmitted to the second image processing device through a data transmitting and receiving unit of the first image processing device (S440).

The sRGB data is received in the second image processing device (S450). In such an embodiment, the second image processing device may receive sRGB data through the data transmitting and receiving unit.

The sRGB data is generated into second camera RGB data using an inverse matrix of a second color space conversion matrix of the second image processing device (S460). In such an embodiment, the sRGB data is converted into second camera RGB data through the second color space conversion unit of the second image processing device. The second color space conversion matrix of the second image processing device converts the second camera RGB data into sRGB data, and an inverse matrix thereof converts the sRGB data matrix into second camera RGB data.

The second camera RGB data is generated into second display R'G'B' data using the first color space conversion matrix of the second image processing device (S470). In such an embodiment, the second camera RGB data is converted into second display R'G'B' data through the first color space conversion unit of the second image processing device. In such an embodiment, the first color space conversion matrix may convert the second camera RGB data into second display R'G'B' data in the second image processing device. The second display R'G'B' data may be displayed into an image through a display unit of the second image processing device.

In an exemplary embodiment, as described above, after first display R'G'B' data that is stored at the first image processing device is converted into first camera RGB data, the first camera RGB data is converted and transmitted to sRGB data of a standardized sRGB color gamut, the second image processing device converts the sRGB data into second camera RGB data and converts the second camera RGB data into second display R'G'B' data and the display unit displays an image based on the second display R'G'B' data. Accordingly, in such an embodiment, image processing devices having different camera color gamuts and display color gamuts may transmit and receive image data without distortion of a color.

While this invention has been described in connection with what is presently considered to be practical exemplary embodiments, it is to be understood that the invention is not limited to the disclosed embodiments, but, on the contrary, is intended to cover various modifications and equivalent arrangements within the spirit and scope of the appended claims.

What is claimed is:

1. An image processing device, comprising:
   a camera sensor unit which generates a bayer image;
   a demosaicking unit which converts the bayer image into a red image, a green image and a blue image;
   a first color space conversion unit which converts first camera RGB data comprising data of the red image, the green image and the blue image into first display R'G'B' data using a first color space conversion matrix; and
   a display unit which displays an image using the first display R'G'B' data,
   wherein the first color space conversion matrix is calculated from a relationship, in which the product of the first color space conversion matrix and a transpose of a first N×3 matrix is a transpose of a second N×3 matrix,
   wherein the first N×3 matrix represents camera RGB data of N number of colors, and the second N×3 matrix represents display R'G'B' data of the N number of colors, which are calculated by measuring the N number of colors displayed in the display unit using a spectrophotometer.

2. The image processing device of claim 1, further comprising:
   a second color space conversion unit which converts the first camera RGB data into first sRGB data comprising red image data, green image data and blue image data in an sRGB color gamut using a second color space conversion matrix.

3. The image processing device of claim 2, wherein
   the second color space conversion matrix is calculated from a relationship, in which the product of the second color space conversion matrix and a transpose of the first N×3 matrix, is a transpose of a third N×3 matrix,
   wherein the third N×3 matrix represents sRGB data of the N number of colors in the sRGB color gamut.

4. The image processing device of claim 2, further comprising:
   a data transmitting and receiving unit which transmits the first sRGB data and receives second sRGB data.

5. The image processing device of claim 4, wherein
   the second color space conversion unit converts the second sRGB data into second camera RGB data using an inverse matrix of the second color space conversion matrix,
   the first color space conversion unit converts the second camera RGB data into second display R'G'B' data using the first color space conversion matrix, and
   the display unit displays an image using the second display R'G'B' data.

6. The image processing device of claim 4, further comprising:
   a data storage unit which stores the first display R'G'B' data.

7. The image processing device of claim 6, wherein
   the first color space conversion unit converts the first display R'G'B' data, which are stored at the data storage unit, into the first camera RGB data using an inverse matrix of the first color space conversion matrix.

8. The image processing device of claim 1, further comprising:
   a pre-processing unit which adjusts a black level of the bayer image and removes noise in the bayer image.

9. The image processing device of claim 1, further comprising:
   a white balancing unit which performs white balancing of the bayer image.

10. The image processing device of claim 1, further comprising:
    a gamma correction unit which performs gamma correction of the red image, the green image and the blue image based on a visual perceptual property of humans.

11. The image processing device of claim 1, further comprising:
    a post-processing unit which performs a post-processing for adjusting an edge, a contrast and saturation of the first display R'G'B' data.

12. A method of processing an image, the method comprising:
    generating a bayer image comprising a red channel value, a green channel value and a blue channel value;
    converting the bayer image into a red image, a green image and a blue image;
    converting camera RGB data comprising data of the red image, the green image and the blue image into display R'G'B' data using a first color space conversion matrix; and
    displaying an image in a display unit using the display R'G'B' data,
    wherein the first color space conversion matrix is calculated from a relationship, in which the product of the first color space conversion matrix and a transpose of a first N×3 matrix, is a transpose of a second N×3 matrix,
    wherein the first N×3 matrix represents camera RGB data of N number of colors, and the second N×3 matrix represents display R'G'B' data of the N number of colors, which are calculated by measuring the N number of colors displayed in the display unit using a spectrophotometer.

13. The method of claim 12, wherein the generating the bayer image comprises:
    adjusting a black level of the bayer image and removing noise in the bayer image; and
    performing white balancing of the bayer image.

14. The method of claim 12, wherein the converting the bayer image comprises:
    performing gamma correction of the red image, the green image and the blue image based on a visual perceptual property of humans.

15. The method of claim 12, wherein the converting the camera RGB data comprises:
    performing a post-processing for adjusting an edge, a contrast and saturation of the display R'G'B' data.

16. The method of claim 12, further comprising:
    converting the camera RGB data into sRGB data comprising red image data, green image data and blue image data in an sRGB color gamut using a second color space conversion matrix; and
    transmitting the sRGB data through a data transmitting and receiving unit.

17. The method of claim 16, wherein
    the second color space conversion matrix is calculated from a relationship, in which the product of the second color space conversion matrix and a transpose of the first N×3 matrix, is a transpose of a third N×3 matrix,
    wherein the third N×3 matrix represents sRGB data of the N number of colors in the sRGB color gamut.

18. The method of claim 12, further comprising:
    storing the display R'G'B' data at a data storage unit.

19. A method of processing an image, the method comprising:
  receiving sRGB data comprising red image data, green image data and blue image data in an sRGB color gamut through a data transmitting and receiving unit;
  converting the sRGB data into camera RGB data using an inverse matrix of a second color space conversion matrix; and
  converting the camera RGB data into display R'G'B' data using a first color space conversion matrix,
  wherein the first color space conversion matrix is calculated from a relationship, in which the product of the first color space conversion matrix and a transpose of a first N×3 matrix, is a transpose of a second N×3 matrix,
  wherein the first N×3 matrix represents camera RGB data of N number of colors, and the second N×3 matrix represents display R'G'B' data of the N number of colors, which are calculated by measuring the N number of colors displayed in the display unit using a spectrophotometer.

20. The method of claim 19, wherein
  the second color space conversion matrix is calculated from a relationship, in which the product of the second color space conversion matrix and a transpose of the first N×3 matrix, is a transpose of a third N×3 matrix,
  wherein the third N×3 matrix represents sRGB data of the N number of colors in the sRGB color gamut.

21. The method of claim 19, wherein the receiving the sRGB data comprises:
  generating a bayer image comprising a red channel value, a green channel value and a blue channel value in a first image processing device;
  converting the bayer image into a red image, a green image and a blue image;
  converting camera RGB data comprising data of the red image, the green image and the blue image into the sRGB data using the second color space conversion matrix in the first image processing device; and
  receiving the sRGB data from the first image processing device.

22. The method of claim 19, wherein the receiving the sRGB data comprises:
  converting first display R'G'B' data, which is stored at the first image processing device, into first camera RGB data using an inverse matrix of the first color space conversion matrix in the first image processing device;
  converting the first camera RGB data into the sRGB data using the second color space conversion matrix in the first image processing device; and
  receiving the sRGB data from the first image processing device.

* * * * *